Nov. 19, 1957 D. A. NORTON ET AL 2,813,689
CONVOLVING AIRCRAFT CONTROL SURFACES AND ARTICULATED TABS
Filed Nov. 29, 1954 2 Sheets-Sheet 1

INVENTOR.
DAVID A. NORTON
ROLAND J. WHITE
BY
ATTORNEYS

United States Patent Office 2,813,689
Patented Nov. 19, 1957

2,813,689

CONVOLVING AIRCRAFT CONTROL SURFACES AND ARTICULATED TABS

David A. Norton, Bellevue, and Roland J. White, Seattle, Wash., assignors to Boeing Airplane Company, Seattle, Wash., a corporation of Delaware Application November 29, 1954, Serial No. 471,740

8 Claims. (Cl. 244—82)

The present invention involves the combination of an articulated tab and control surface interconnected so that the articulated parts of the tab are deflected relative to each other in the same direction as they are deflected relative to the aircraft control surface which carries them.

Particularly at high speeds, it has been found that an aircraft control surface, when swung through a large angle from neutral position, tends to blanket a tab which effects swinging of such control surface relative to a horizontally stationary airfoil carrying the control surface. As a result, at larger angles of control surface deflection resistance to further deflection of the tab relative to the control surface decreases progressively with increased deflection of the control surface. Eventually a point may be reached at high aircraft speeds where, without the application of any further effort by the pilot, the tab tends to be deflected farther relative to the control surface, producing a reversed control force. The large control surface deflection at high speeds which occurs under such circumstances creates undesirably great air loads on the control surface and parts of the aircraft associated with it, and also the pilot tends to maneuver the airplane more than he desires because of the reduced or reversed control forces. In large, high-speed airplanes the controls usually are too large for the pilot to manipulate without the assistance of some power or servomechanism; however, the control forces resulting from use of such assisting devices must not be too light or undesirably high deflections of the main control surface may occur.

A convenient aerodynamic servomechanism for assisting movement of a control surface is the control tab. It is desirable, however, for the movement of the pilot's control to be resisted to an increasing extent as the deflection of the main control surface increases, so as to reduce the tendency of the pilot to over-control, and for the control forces to be greater at higher airspeeds for a given deflection of the control surface. In systems where a control tab has been used to effect movemnt of a control surface, it is customary to utilize a spring to supplement the air loads on the tab for resisting movement of the pilot's control. These springs in certain cases will require additional resisting forces which increase with air speed. It is desirable for the resistance to movement of a control surface by the pilot to increase substantially proportionately to the deflection of the control surface, as well as to increase with an increase in air speed. It is difficult to maintain such proportionality by the combination of the air load on a control tab and the loading of a spring, because the air load on the usual tab decreases with increase in control surface deflection at high speeds and large control surface deflections, as mentioned, and in some instances to such a great degree that the air loads on the tab may even be reversed.

It is the principal object of the present invention to provide a combination of a compound articulated tab structure with a swingable aircraft control surface in which the articulated tab parts will deflect conjointly in the same direction relative to the control surface so as to produce an air load on the composite tab increasing progressively with increasing control surface deflection throughout the entire range of control surface movement to either side of its neutral position. Correspondingly, it is an object to provide a resistance to movement of the pilot's control which increases progressively throughout the entire range of increase in movement of the control surface from neutral position, and preferably to effect such a progressive increase in resistance which will be substantially proportional to the departure of the control surface from neutral position and which will increase with increase in airspeed.

Specifically, it is an object to control movement of a forward tab part by actuation of the pilot's control and to effect movement of a rearward tab part by movement of the forward tab part relative to the control surface.

An additional object is to provide such a combination of a control surface and an articulated tab which will be of simple construction, which will operate reliably and the arrangement and proportions of which can be altered easily to vary the relative deflections of the tab parts corresponding to a predetermined deflection of the control surface relative to its supporting structure.

In the drawings a typical arrangement of our control surface and articulated tab combination is shown as applied to an airplane rudder, but it will be understood that such a combination can, if desired, be used for other aircraft control surfaces, such as the elevators of an airplane.

Figure 1 is a chordwise sectional view through a fragmentary portion of a vertical fin, a rudder carried by such fin, and an articulated tab carried by the rudder, the several components being shown in neutral position, Figure 2 is a similar view, but showing the rudder deflected to starboard relative to the vertical fin, and Figure 3 is a similar view with the rudder deflected to port relative to the vertical fin.

Figure 1:
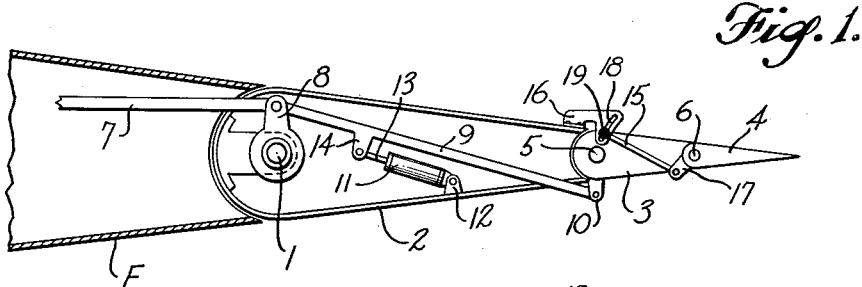
Figure 2:
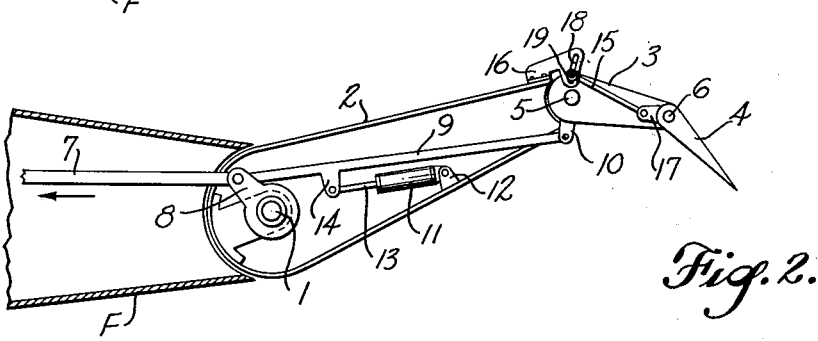
Figure 3:
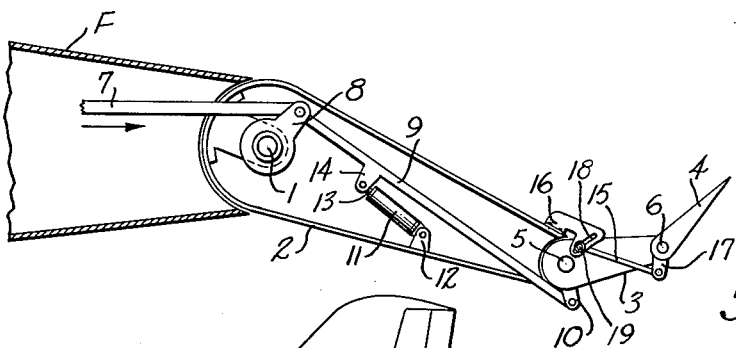
Figure 4:
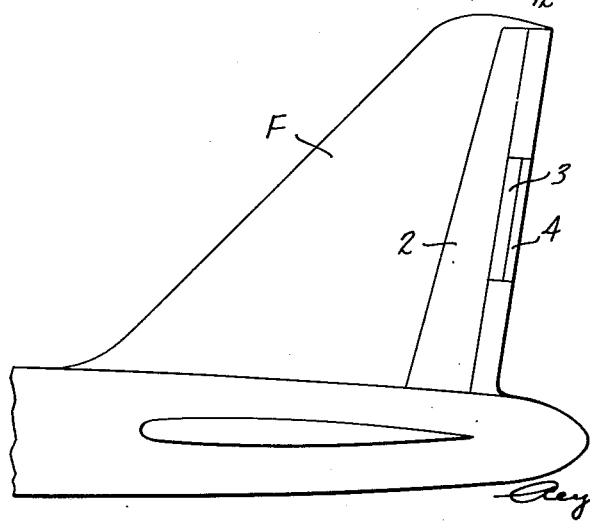
Figure 4 is a side elevational view showing a fragmentary portion of the vertical fin, the rudder and the articulated tab.

The vertical fin F supports the hinge 1 on which the rudder 2 is mounted to swing relative to the fin as shown in Figures 2 and 3. On the trailing edge of the rudder is mounted the articulated tab, shown as including a forward tab section 3 and a rearward tab section 4, although the articulated tab could, if desired, incorporate a greater number of articulated sections. The forward section is carried by a pivot 5 mounted on the control surface 2, and the two tab sections 3 and 4 are interconnected by the pivot 6. Control mechanism is then provided to effect convolving swinging of the sections of the articulated tab relative to the control surface.

As shown in Figure 2, when the forward section 3 of the articulated tab is swung to port relative to the control surface by the pilot's control, the rearward tab section 4 will be swung farther relative to the control surface in such direction than the forward tab section. Thus the rearward tab section moves to port relative to the forward tab section. Such movement of the sections causes the control surface to be swung to starboard relative to the fin F. Conversely, as shown in Figure 3, when the forward section of the articulated tab is swung to starboard relative to the control surface by the pilot's control, the rearward tab section will be swung still farther to starboard relative to the control surface. The rearward tab section therefore swings to starboard relative to the forward tab section. Such tab movement will swing the control surface to port relative to the fin F.

If the tab were not of the articulated type, the mechanism for swinging the control surface would be conventional. Such mechanism includes a pilot-operated control rod 7 which is pivoted to an arm 8 mounted to swing about the axis of the rudder hinge 1. The further link 9 interconnects such arm and a horn 10 projecting from one side of the forward tab section. Preferably such horn and the arm 8 project oppositely relative to the chord of the rudder so that the link 9 crosses the rudder chord line. Because the aerodynamic loading of such a tab is insufficient to exert the desired amount of resistance to movement of the pilot-operated rod 7, a double-acting spring cartridge 11 is connected between the rudder 2 and the rod 9. One end of such cartridge may be pivotally connected to a lug 12 fixed to the rudder, and a spring-pressed rod 13 resiliently centered by spring means within the cartridge 11 is pivotally connected to a lug 14 on the link 9.

In order to swing the rearward section 4 of the articulated tab relative to the forward section 3 when the latter is swung relative to the control surface 2, a link 15 interconnecting the rearward tab section and the control surface is utilized. One end of such link is pivotally connected to the link-connecting horn 16 mounted on the trailing portion of the control surface offset to one side of the control surface and located adjacent to the pivot 5 of the forward tab section, and the other end of such link is pivotally connected to the link-connecting horn 17 offset to the opposite side of the rearward tab section pivot axis and located adjacent to the rearward tab section pivot 6. The control surface 2 is illustrated as a rudder with the horn 16 projecting from its starboard side and the horn 17 is shown projecting from the port side of the rearward tab section. Thus the link 15 will cross the chord line of the forward tab section. The pivot axes of the ends of this link are shown as being located between the pivots of the tab sections when these sections are in alignment.

When the link 9 is moved forward by the pilot's control, pulling on the rod 7, as shown in Figure 2, the forward section 3 of the tab will be swung in a clockwise direction as seen in Figure 2 relative to the rudder 2, that is, to port. Such swinging movement would increase the distance between the horn 16 on the trailing end of the control surface and the end of the horn 17 on the rearward tab section if there were no change of angle between the tab sections 3 and 4. Consequently, the horn 17 will be moved toward tab section 3 so that tab section 4 will be swung in the same direction relative to tab section 3 as that tab section is swung relative to the rudder 2, namely, to port, as shown in Figure 2. Such movement to port of the two tab sections 3 and 4 will produce aerodynamic forces effecting swinging of the rudder 2 to starboard as shown in Figure 2, as mentioned previously.

Conversely, if the control rod 7 is pushed to the right as shown in Figure 3, the horn 10 on the forward tab section will be moved away from the rudder 2, thus swinging the forward control tab section to starboard relative to the rudder. Such swinging of the forward tab section relative to the rudder will tend to decrease the distance between the horn 16 adjacent to the trailing edge of the rudder and the end of horn 17 on the rearward control tab section 4. Consequently, the link 15 will effect swinging of the rearward tab section 4 relative to the forward tab section 3 about the pivot 6 in the same direction as the forward tab section was swung relative to the rudder, namely, to starboard. Such conjoint swinging of the control tab sections 3 and 4 will produce aerodynamic forces which will swing the rudder in the opposite direction, namely, to port, as shown in Figure 3.

Because the rearward tab section 4 is swung in each instance relative to the forward tab section 3 in the same direction that the forward tab section is swung relative to the control surface, the trailing edge of the rearward tab section will project laterally beyond the chord line extended of the control surface a distance considerably farther than it would if the tab were not articulated. Such disposition of the rearward tab section has the double effect of increasing the aerodynamic force acting to swing the rudder away from its neutral position and of increasing the resistance to movement of the control rod 7 in the controlling direction. The greater air pressure on particularly the trailing portion of the articulated tab, which is farthest from the tab hinge 5, produces a tab deflection resisting moment which is greatly augmented over that produced by a unitary tab.

Moreover, the length of link 15 and the location of the points at which it is connected to the rudder and to the rearward tab section may be selected so that, as the angle of deflection of the forward tab section 4 relative to the control surface increases, the angle of deflection of the rearward tab section relative to the forward tab section will change to a greater or lesser extent than illustrated in the drawings. Such relative displacement of the tab sections if increased will still further increase the resistance to movement of the control rod 7 so that, in conjunction with the spring mechanism 11, the resistance to movement of such control rod by the pilot will always be progressively greater for increased control surface deflections. By proportioning the tab control mechanism described appropriately, such resistance may be substantially proportional to the rudder deflection throughout the entire possible range of rudder movement. Any slight departure from such exact proportionality, however, will not be particularly detrimental.

In order to provide for adjustment of the link 15 to effect swinging of the rearward tab section different amounts relative to the forward tab section for a given degree of swinging of the forward tab section relative to the control surface, the pivot axis of one of the ends of link 15 may be adjustable. In the drawings the horn 16 is shown as having an arcuate slot 18 in which the bearing 19 mounted on one end of the link 15 may slide. This slot is formed on an arc concentric with the pivot axis of the other end of link 15 on the rearward tab section horn 17.

If the bearing 19 is moved along slot 18 away from the forward tab section pivot 5, the movement of the rearward tab section 4 relative to the forward tab section 3 will be greater for a given movement of the forward tab section relative to the control surface 2. Conversely, if the bearing 19 is moved toward the axis of the forward tab section pivot 5, the movement of the rearward tab section 4 relative to such forward tab section will be less for a given movement of the forward tab section relative to the control surface than illustrated in Figures 2 and 3. Moreover, the radius of arc 18 preferably is equal to the distance between the forward tab section pivot 5 and the pivot axis of link 15 on the rearward tab section horn 17 when the tab sections are in alignment. If the link 15 could be swung, therefore, to place bearing 19 in registry with the axis of pivot 5, the rearward tab section would not be displaced at all relative to the forward tab section as the latter is swung relative to the control surface 2.

Figure 5:
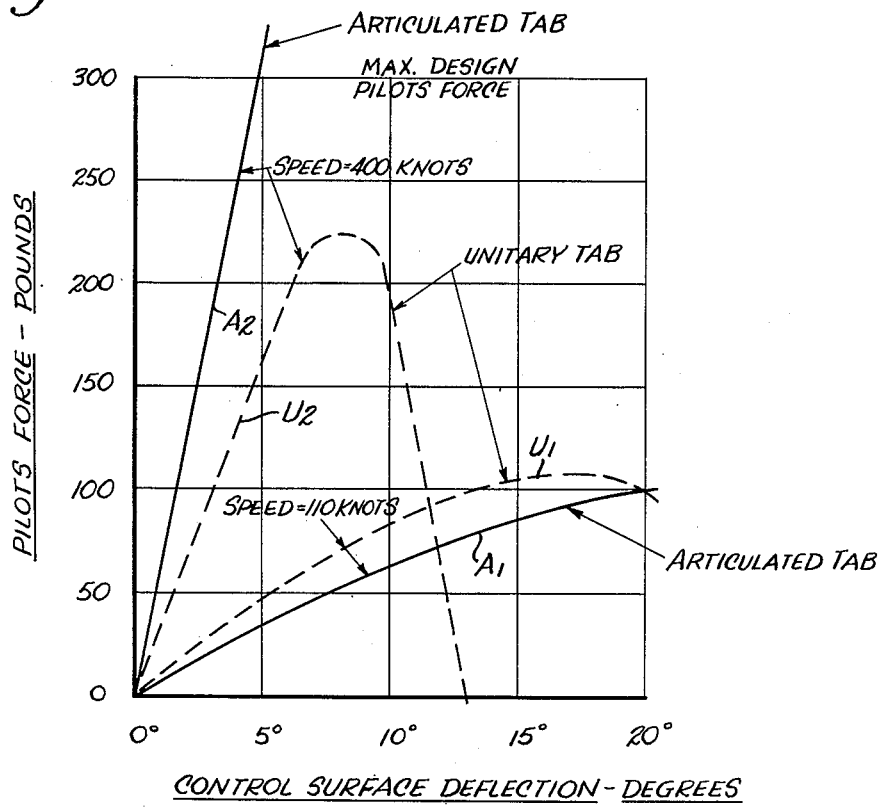
Figure 5 is a graph illustrating the comparison between control forces for a conventional tab and for an articulated tab under different conditions of speed and control surface deflection.

In the force-displacement diagram of Figure 5 a comparison between the forces produced by a conventional unitary tab and by a typical articulated tab arrangement according to the present invention is illustrated at two selected speeds. Curve U1 illustrates the relationship between the force which must be exerted by the pilot and the control surface deflection at a speed of 110 knots over a range of 20° of control surface deflection. It will be noted that at about 17½° the effort which must be exerted by the pilot to increase the deflection of the control surface begins to drop.

The curve A1, by comparison, represents the articulated tab relationship between the force which must be exerted by the pilot and the angle of control surface deflection at the same speed. It will be noted that there is no reversal of the curvature in this curve at high angles of control surface deflection, and the line generally is almost straight, showing a very consistent relationship between the angle of control surface deflection and the pilot's force required to obtain that deflection. Moreover, such an articulated tab is more effective, particularly at low speeds, because the same aerodynamic action can be produced on a control surface with an articulated tab of smaller area than would be required for a unitary tab. Also, in order to obtain equal resistance to movement by the pilot, particularly at larger angles of deflection of the control surface, it is necessary to use a stronger resisting spring for a unitary tab than for an articulated tab having a corresponding aerodynamic effect on the control surface.

While the curves A1 and U1 show that at the comparatively low speed of 110 knots a unitary tab would be satisfactory, although not having as desirable characteristics as the articulated tab, a comparison of the curves A2 and U2 show that for high speeds the unitary tab would not be satisfactory, whereas the articulated tab is satisfactory. The curves A1 and A2 represent the force to control surface deflection relationship for the same articulated tab installation at two different speeds, and the curves U1 and U2 illustrate the characteristics of the same unitary tab for the same two speeds.

Comparing curves U1 and U2, it will be seen that at the higher speed of 400 knots the reversal in pilot's force occurs at an angle of control surface deflection less than half as great as at 110 knots, namely an angle of approximately 8¼°. Moreover, if the control surface is deflected to an angle greater than 8¼°, the force which the pilot must exert actually will decrease until at an angle beyond 13° the pilot must exert a force in the opposite direction on the tab in order to prevent it from increasing the angle of control surface deflection.

Where an articulated tab is employed, however, at a speed of 400 knots the pilot's force to control surface deflection relationship may be as represented by the curve A2 of Figure 5. Here again the pilot's force varies almost linearly with control surface deflection angle, and at less than five degress angle of control surface deflection the maximum design pilot's force of 300 pounds is reached. The curves representing the articulated type of tab, therefore, show that the pilot's force does not reverse even indirection, so that it could not, of course, reverse in absolute value within the operating range of the control surface. It is evident, on the contrary, that at some speed between 110 knots and 400 knots a unitary tab might be actuated not only beyond the force amount reversal crest of the curve, but actually beyond the force direction reversal point.

A further advantage of the articulated tab mechanism of the present invention is indicated in Figure 5, namely that for low angles of control surface deflection the force required to manipulate the control surface increases more rapidly with an increase in aircraft speed than where a unitary type of tab is used. Thus, as illustrated in Figure 5, at angles of control surface deflection less than about five degress only about three and one-half times as much force on a unitary type of tab is required at 400 knots over that required at 110 knots to produce a given displacement of the control surface. Where an articulated type of tab is used, however, almost ten times as much force is required at 400 knots as at 110 knots to effect a given displacement. This difference occurs because of the greater aerodynamic reaction force produced on an articulated tab than on a unitary type of tab. This phenomenon makes it much more difficult for the pilot to over-control at high speeds with an articulated type of tab than where a unitary tab is employed.

We claim as our invention:

1. Aircraft control mechanism comprising a movable control surface, an articulated tab including a forward tab section pivoted on said control surface and a rearward tab section pivoted on said forward tab section, control means operatively connected to said forward tab section and movable to swing the same relative to said control surface, means mounting said control means for movement independently of movement of said control surface and means interconnecting said control surface and said rearward tab section and operable to swing said rearward tab section relative to said forward tab section in the same direction as said forward tab section is swung relative to said control surface.

2. Aircraft control mechanism comprising a swingable rudder, an articulated tab including a forward tab section pivoted on the trailing portion of said rudder and a rearward tab section pivoted on the trailing portion of said forward tab section, pilot-operated control means operatively connected to said forward tab section and movable to swing the same relative to said rudder, means mounting said control means for movement independently of movement of said rudder, and means interconnecting said rudder and said rearward tab section and operable to swing said rearward tab section relative to said forward tab section in the same direction as said forward tab section is swung relative to said rudder.

3. Aircraft control mechanism comprising a swingable control surface, an articulated tab including a forward tab section pivoted on the trailing portion of said control surface and a rearward tab section pivoted on the trailing portion of said forward tab section, pilot-operated control means operatively connected to said forward tab section and movable to swing the same relative to said control surface, means mounting said control means for movement independently of swinging of said control surface, a link-connecting member on the trailing portion of said control surface offset transversely of the control surface from the pivot axis of said forward tab section, a link-connecting member on the forward portion of said rearward tab section offset transversely of said rearward tab section from the pivot axis of said rearward tab section in the direction opposite that to which said first link-connecting member is offset, and a link interconnecting said link-connecting members, intersecting the chord of said forward tab section and operable to swing said rearward tab section relative to said forward tab section in the same direction as said forward tab section is swung relative to said control surface.

4. Aircraft control mechanism comprising a swingable control surface, an articulated tab including a forward tab section pivoted on the trailing portion of said control surface and a rearward tab section pivoted on the trailing portion of said forward tab section, pilot-operated control means operatively connected to said forward tab section and movable to swing the same relative to said control surface, means mounting said control means for movement independently of swinging of said control surface, a link-connecting member on the trailing portion of said control surface offset transversely of the control surface from the pivot axis of said forward tab section, a link-connecting member on the forward portion of said rearward tab section offset transversely of said rearward tab section from the pivot axis of said rearward tab section in the direction opposite that to which said first link-connecting member is offset, and a link interconnecting portions of said link connecting members located between the forward tab section pivot axis and the rearward tab section pivot axis chordwise of the forward tab section, intersecting the chord of said forward tab section and operable to swing said rearward tab section relative to said forward tab section in the same direction as said forward tab section is swung relative to said control surface.

5. Aircraft control mechanism comprising a swingable control surface, an articulated tab including a forward tab section pivoted on the trailing portion of said control surface and a rearward tab section pivoted on the trailing portion of said forward tab section, pilot-operated control means operatively connected to said forward tab section and movable to swing the same relative to said control surface, means mounting said control means for movement independently of swinging of said control surface, a first horn projecting from one side of the trailing portion of said control surface, a second horn projecting from the forward portion of said rearward tab section and from the side thereof opposite that corresponding to the side of said control surface from which said first horn projects, and a link interconnecting said horns, intersecting the chord of said forward tab section and operable to swing said rearward tab section relative to said forward tab section in the same direction as said forward tab section is swung relative to said control surface.

6. Aircraft control mechanism comprising a swingable control surface, an articulated tab including a forward tab section pivoted on the trailing portion of said control surface and a rearward tab section pivoted on the trailing portion of said forward tab section, pilot-operated control means operatively connected to said forward tab section and movable to swing the same relative to said control surface, means mounting said control means for movement independently of swinging of said control surface a first horn projecting from one side of the trailing portion of said control surface adjacent to the pivot of the forward tab section, a second horn projecting from the forward portion of said rearward tab section adjacent to the pivot of the rearward tab section and from the side thereof opposite that corresponding to the side of said control surface from which said first horn projects, and a link interconnecting said horns, intersecting the chord of said forward tab section and operable to swing said rearward tab section relative to said forward tab section in the same direction as said forward tab section is swung relative to said control surface.

7. Aircraft control mechanism comprising a swingable control surface, an articulated tab including a forward tab section pivoted on the trailing portion of said control surface and a rearward tab section pivoted on the trailing portion of said forward tab section, pilot-operated control means operatively connected to said forward tab section and movable to swing the same relative to said control surface, means mounting said control means for movement independently of swinging of said control surface a first horn projecting from one side of the trailing portion of said control surface, a second horn projecting from the forward portion of said rearward tab section and from the side thereof opposite that corresponding to the side of said control surface from which said first horn projects, a link having one end connected to one of said horns and intersecting the chord of said forward tab section, and means connecting the other end of said link to the other of said horns and adjustable to vary the degree of offset of such other link end from the adjacent tab section pivot axis, said link thereby being operable to swing said rearward tab section relative to said forward tab section in the same direction as said forward tab section is swung relative to said control surface an amount relative to the amount of swing of said forward tab section dependent upon the degree of offset from the adjacent tab section pivot axis of the end of said link established by said adjustable connecting means.

8. Aircraft control mechanism comprising a swingable control surface, an articulated tab including a forward tab section pivoted on the trailing portion of said control surface and a rearward tab section pivoted on the trailing portion of said forward tab section, pilot-operated control means operatively connected to said forward tab section and operable to swing the same relative to said control surface, a first link-connecting member on the trailing portion of said control surface having an arcuate slot therein of a radius equal to the distance between the center of curvature of such arc and the pivot axis of said forward tab section and located to one side of such pivot axis transversely of the control surface, a second link-connecting member on the forward portion of said rearward tab section offset transversely of said rearward tab section from the pivot axis of said rearward tab section to the side thereof opposite the side of the forward tab section pivot axis to which such slot is located, a link having one end connected to said second link-connecting member and intersecting the chord of said forward tab section, and bearing means carried by the other end of said link and received in the slot of said first link-connecting member for adjustment therealong to vary the spacing between the axis of said bearing means and the pivot axis of said forward tab section, said link thereby being operable to swing said rearward tab section relative to said forward tab section in the same direction as said forward tab section is swung relative to said control surface, and through an angle relative to said forward tab section for a given angle of swing of said forward tab section relative to said control surface variable with the spacing between said bearing means axis and the pivot axis of said forward tab section.

References Cited in the file of this patent

UNITED STATES PATENTS

| | | |
|---|---|---|
| 53,936 | Ruthven | Apr. 10, 1866 |
| 1,582,391 | Flettner | Apr. 27, 1926 |
| 2,416,958 | Sears | Mar. 4, 1947 |

FOREIGN PATENTS

| | | |
|---|---|---|
| 363,391 | Italy | Oct. 4, 1938 |